United States Patent
Ohshima

(10) Patent No.: US 7,801,658 B2
(45) Date of Patent: Sep. 21, 2010

(54) CRUISE CONTROL DEVICE AND METHOD FOR VEHICLES

(75) Inventor: Keiji Ohshima, Gamagori (JP)

(73) Assignee: Denso Corporation, Kariya (JP)

( * ) Notice: Subject to any disclaimer, the term of this patent is extended or adjusted under 35 U.S.C. 154(b) by 228 days.

(21) Appl. No.: 11/495,593

(22) Filed: Jul. 31, 2006

(65) Prior Publication Data
US 2007/0067087 A1    Mar. 22, 2007

(30) Foreign Application Priority Data
Sep. 1, 2005    (JP)    ............................. 2005-253172

(51) Int. Cl.
*B60T 8/32* (2006.01)
*B60K 31/00* (2006.01)
*G06F 17/00* (2006.01)

(52) U.S. Cl. .............................. 701/93; 701/1; 701/84; 701/90; 180/170; 180/174; 123/349

(58) Field of Classification Search ..................... 701/1, 701/84, 90, 93; 180/170, 174; 123/349
See application file for complete search history.

(56) References Cited

U.S. PATENT DOCUMENTS

| | | | | |
|---|---|---|---|---|
| 5,088,043 | A * | 2/1992 | Akishino et al. ............... | 701/93 |
| 5,625,558 | A * | 4/1997 | Togai et al. .................... | 701/93 |
| 5,799,262 | A * | 8/1998 | Suzuki ........................... | 701/93 |
| 6,078,859 | A * | 6/2000 | Jastrzebski et al. ............ | 701/93 |
| 6,178,371 | B1 * | 1/2001 | Light et al. .................... | 701/93 |
| RE37,434 | E * | 11/2001 | Onari et al. ................... | 701/110 |
| 6,988,028 | B2 * | 1/2006 | Iriyama ......................... | 701/93 |
| 2001/0025218 | A1* | 9/2001 | Shimada et al. ............... | 701/86 |
| 2004/0040765 | A1* | 3/2004 | Satou et al. ................... | 180/170 |
| 2006/0155451 | A1* | 7/2006 | Kuwahara et al. ............. | 701/51 |

FOREIGN PATENT DOCUMENTS

| | | |
|---|---|---|
| JP | 8-216729 | 8/1996 |
| JP | 8216729 | * 8/1996 |
| JP | 2003-227364 | 8/2003 |
| JP | 2004-300921 | 10/2004 |

OTHER PUBLICATIONS

Office Action dated Aug. 13, 2009 issued in corresponding Japanese Application No. 2005-253172 with an at least partial English language translation thereof.

* cited by examiner

*Primary Examiner*—Jack Keith
*Assistant Examiner*—Chuong P Nguyen
(74) *Attorney, Agent, or Firm*—Nixon & Vanderhye, PC

(57) ABSTRACT

The output torque of an in-vehicle engine is controlled based on the larger one of a pedal torque set by a pedal torque setting section in accordance with an operation amount of an accelerator pedal and a cruise torque for cruise control set by a cruise torque setting section. At the time of starting the cruise control, an initial value of the cruise torque is set by an initial value setting section as the smaller one of the torque required for traveling a vehicle at a constant speed of a target vehicle speed and the pedal torque.

8 Claims, 7 Drawing Sheets

CRUISE CONTROL DEVICE AND METHOD FOR VEHICLES

CROSS-REFERENCE TO RELATED APPLICATION

This application is based on Japanese Patent Application No. 2005-253172 filed on Sep. 1, 2005, the disclosure of which is applied herein by reference.

FIELD OF THE INVENTION

The present invention relates to a cruise control device and method for vehicles, which makes a speed of a vehicle follow a prescribed target speed so that the vehicle travels at a constant speed.

BACKGROUND OF THE INVENTION

A conventional cruise control device provides for control to maintain a traveling speed of a vehicle, i.e., a vehicle speed at a constant speed as a target, based upon an instruction of cruise control through an operation of a cruise control switch by a user (JP-A-8-216729).

In such a cruise control device, when a user desires to start the cruise control, the user operates an accelerator pedal to adjust an actual vehicle speed to a desired vehicle speed. Then, when the actual vehicle speed rises or falls to the desired vehicle speed, the cruise control switch is operated. Thereby, the cruise control device defines the vehicle speed at this moment as a target speed and thereafter performs the cruise control for making the actual vehicle speed follow the target vehicle speed. That is, output torque of an in-vehicle engine is feedback-controlled in accordance with a deviation between the actual vehicle speed and the target vehicle speed, thereby to automatically regulate the actual vehicle speed to the target vehicle speed. At the time of starting the cruise control, however, an initial value of the output torque of the in-vehicle engine is not defined in accordance with the deviation between the actual vehicle speed and the target vehicle speed.

There is, therefore, conventionally proposed a cruise control device, in which a value, at the time of cruise starting, with respect to pedal torque as torque defined in accordance with an operation amount of the accelerator pedal is defined as an initial value of the output torque at the time of starting the cruise control. This is because the pedal torque at the time of the cruise starting is considered an appropriate torque for maintaining a vehicle speed at the time of starting the cruise control.

However, the cruise control device is adapted to set an actual vehicle speed at the time of operating the cruise control switch as a target vehicle speed even when the cruise control switch is operated in an acceleration state of a vehicle where the accelerator pedal is pressed down deep. In addition, torque in accordance with an operation amount of the accelerator pedal at the time of operating the cruise control switch is defined as an initial value of the torque of the in-vehicle engine at the time of the cruise starting. However, since the initial value of the torque in this case is the torque at the time of the accelerating, it will be greater than appropriate torque for maintaining the target vehicle speed. Accordingly, even after the cruise control is started, the acceleration of the vehicle continues for a little while, resulting in undesired drivability of a vehicle.

SUMMARY OF THE INVENTION

In view of the above, the present invention addresses this need in the conventional art as well as other needs, which will become apparent to those skilled in the art from this disclosure.

The present invention has an object of providing a cruise control device and method, which can provide satisfactory drivability of a vehicle at the time of starting cruise control.

According to a cruise control device as one aspect of the present invention, an actual vehicle speed, an accelerator operation amount and a cruise control switch state are detected. A first value related to an output torque of an engine is set thereby to feedback-control a vehicle speed to a target speed, and a second value also related to the output torque of the engine is set based on the accelerator operation amount. The output of the engine is controlled based on either of the first value and the second value, when the cruise control is performed. At the time of starting cruise control, the first value is limited to be smaller than an initial value related to an output torque and set based on a vehicle speed at the time of cruise control.

According to a cruise control method as another aspect of the present invention, two engine output torques for a start of cruise control are determined. One is determined based on a vehicle speed detected at time of a cruise control instruction, and the other is determined based on an accelerator operation amount at the time of the cruise control instruction. The cruise control is started by selecting a smaller one of the engine output torques and initially controlling an engine to produce the selected engine output torque.

BRIEF DESCRIPTION OF THE DRAWINGS

Other objects, features, and advantages of the present invention will become more apparent from the following detailed description made with reference to the accompanying drawings, in which like parts are designated by like reference numbers. In the drawings.

DETAILED DESCRIPTION OF THE PREFERRED EMBODIMENTS

First Embodiment

Figure 1:
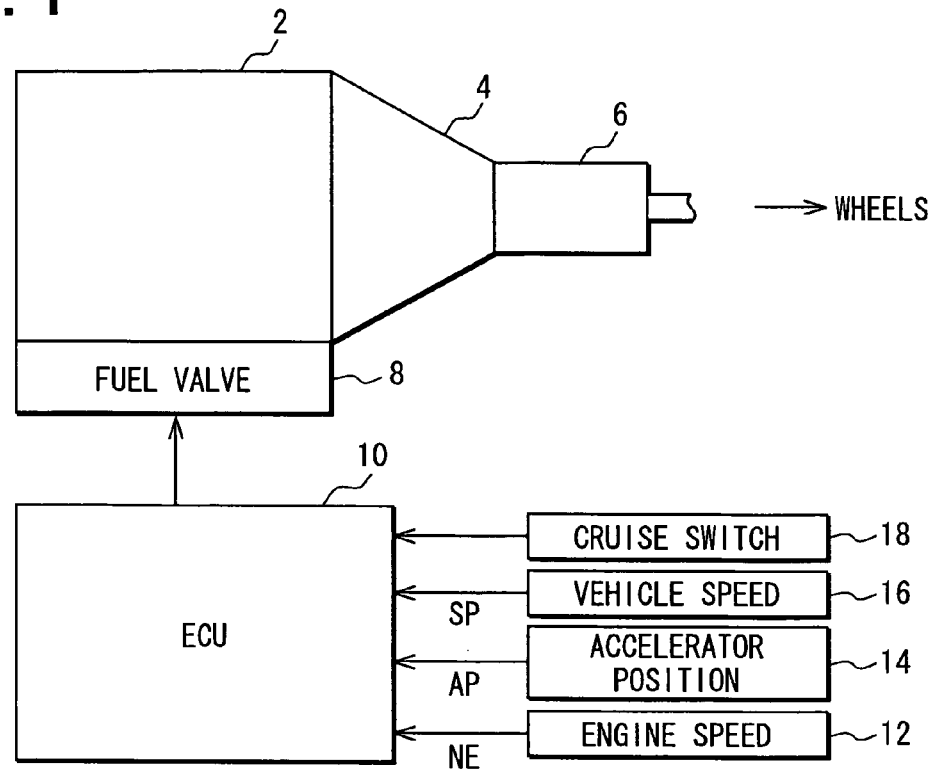
FIG. 1 is a schematic block diagram showing an engine system in a first embodiment of the present invention.

As shown in FIG. 1, a diesel engine 2 is provided in a vehicle (not shown) to drive wheels of the vehicle through a torque converter 4 and automatic transmission 6. The diesel engine 2 is provided with an actuator such as a fuel injection valve 8.

An electronic control unit (ECU) 10 is constructed mainly of a microcomputer and operates the actuator such as the fuel injection valve 8 to control the output torque of the diesel engine 2. For controlling the output torque of the diesel engine 2, the ECU 10 uses the detection result of a rotational speed NE of an output shaft of the diesel engine 2 by an engine rotational speed sensor 12, the detection result of an operation amount (depression amount) AP of an accelerator pedal by an accelerator positioning sensor 14 and the detection result (actual vehicle speed) of a traveling speed SP of the vehicle by a vehicle speed sensor 16.

Further, the ECU 10 receives a detection signal with respect to an operation state of a cruise control switch 18 operated by a user (vehicle driver). The cruise control switch 18 is for instructing a start of cruise control. The cruise control switch 18 is equipped with a set switch for setting a present vehicle speed as a target vehicle speed, a resume switch for resuming the cruise control and the like. In addition, the ECU 10 performs the cruise control in accordance with the operation state of the cruise control switch 18.

Figure 2:
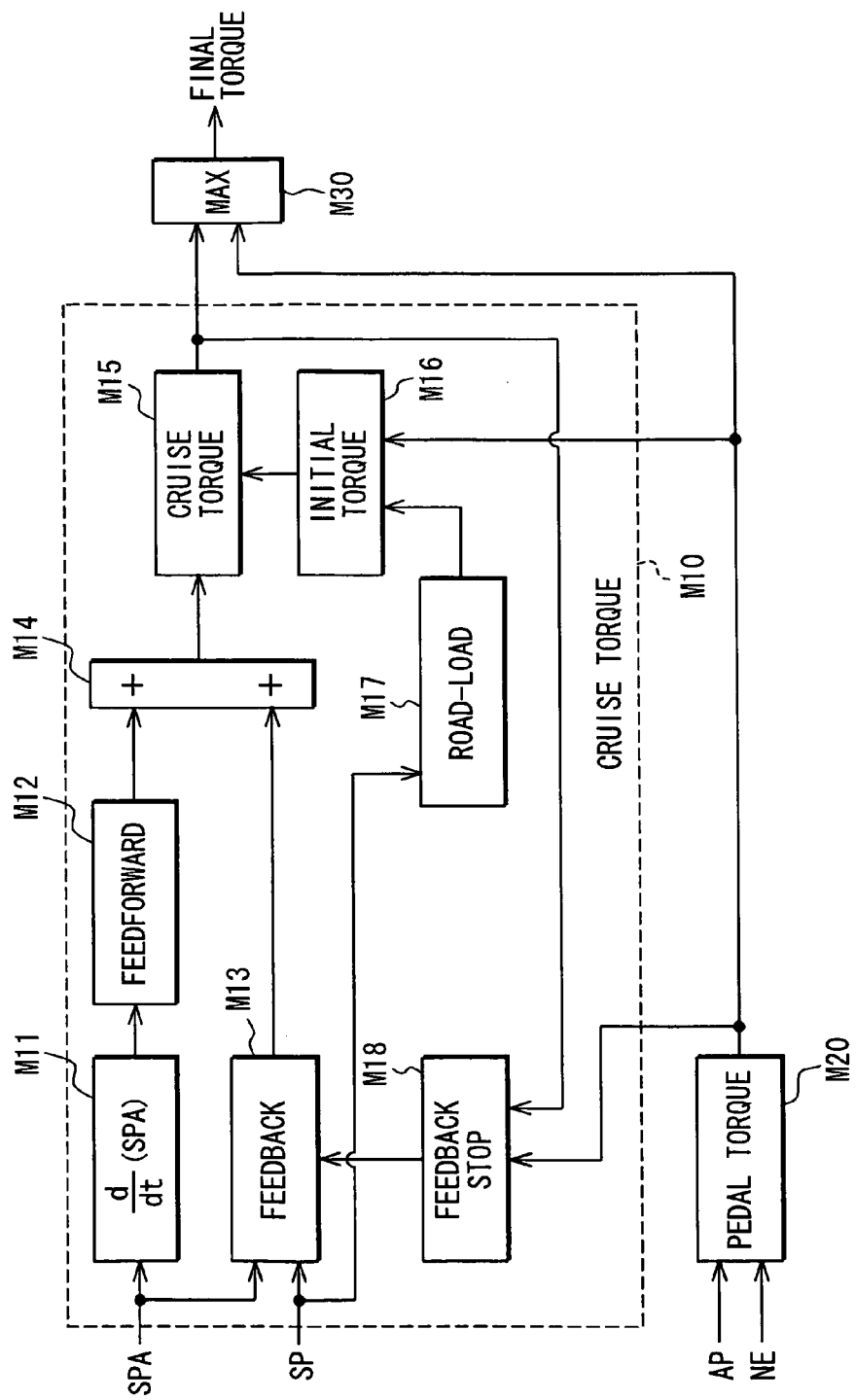
FIG. 2 is a functional block diagram showing cruise control in the first embodiment.

FIG. 2 shows functional blocks which, when a target vehicle speed SPA is set, perform the control for making an actual vehicle speed SP follow the target vehicle speed SPA, among functional blocks with respect to the control in the ECU 10.

A cruise torque setting section M10 sets, as a first value, an output torque value (cruise torque) of the diesel engine 2 at the time of the cruise controlling, for feedback-controlling the actual vehicle speed to be the target vehicle speed. A pedal torque setting section M20 sets, as a second value, an output torque value (pedal torque or accelerator torque) of the diesel engine 2 required by an operation of the accelerator pedal by a user, based upon an operation amount of the accelerator pedal and a rotational speed of the diesel engine 2. Further, the values set by the cruise torque setting section M10 and by the pedal torque setting section M20 are applied in an output torque calculation section M30 and the one, which is greater than the other, is calculated as a final output torque.

When the target vehicle speed SPA is applied in the cruise torque setting section M10, a change rate of the target vehicle speed SPA is calculated in a calculating section M1 for the change rate of the target vehicle speed. In addition, a calculating section M12 for a feedforward term calculates a control gain (feedforward term) for compensating for a change in the demand torque due to a change in the target vehicle speed SPA, based upon this change rate. In addition, a calculating section M13 for a feedback term calculates a control gain (feedback term) for feedback-controlling the actual vehicle speed SP to be the target vehicle speed SPA, based upon a deviation between the target vehicle speed SPA and the actual vehicle speed SP. The feedforward term and the feedback term are added by an adder M14. A cruise torque calculating section M15 calculates cruise torque based upon an output of the adder M14. An initial value setting section M16 sets an initial value of the cruise torque setting section M10 at the time of starting the cruise control. Further, a calculating section M17 for a road-load value is determined based on data stored in a map form. A feedback stop command section M18 stops calculation of the calculating section M13 for the feedback term.

Figure 3:
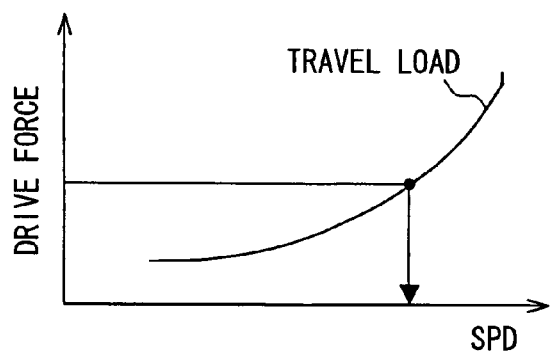
FIG. 3 is a graph showing a relation between driving forces of a tire and vehicle speeds.

Since the target vehicle speed SPA is set at the time of the cruise control, the feedforward term and the feedback term can not be defined before starting the cruise control. FIG. 3 shows a relation between a vehicle speed and a driving force of drive wheels required at the time of driving a vehicle at a constant speed based upon this vehicle speed. More particularly, this relation is also a relation when a vehicle travels on a flat road with no wind in the environment of the vehicle (at the time of no wind). As shown in the figure, as the vehicle speed increases, a value required as the driving force of the drive wheels becomes larger. This is, for example, because, as the vehicle speed increases, an air resistance which the vehicle is subject to becomes larger.

Figure 4:
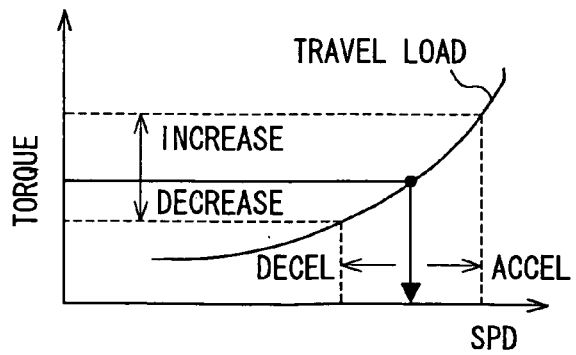
FIG. 4 is a graph showing a relation between output torque and vehicle speeds.

FIG. 4 shows a relation between a vehicle speed and a driving force of drive wheels required at the time of traveling a vehicle at a constant speed based upon this vehicle speed. More particularly, this relation is also a relation when a vehicle travels on a flat road with no wind in the environment of the vehicle (at the time of no wind). There is a correlation between the driving force of the drive wheels and the output torque of the diesel engine 2. However, there is no one-to-one relation therebetween. This is because a gear ratio by the automatic transmission 6 is not directly determined only by a vehicle speed and changes with an operation amount of the accelerator pedal or the like. In the cruise control in a state where the vehicle travels with no wind in the circumference and on a flat road, an appropriate gear ratio for each target vehicle speed can be determined directly. Therefore, a traveling load curve as a relation between a vehicle speed and a driving force in FIG. 3 can be converted into a relation between a vehicle speed and output torque of the engine 2. A conversion traveling load characteristic shown in FIG. 4 is obtained by converting the traveling load curve into the relation between the vehicle speed and the output torque. As shown in the figure, a vehicle is accelerated when actual torque is greater than the output torque defined by the vehicle speed and the conversion traveling load characteristic, and the vehicle is decelerated when the actual torque is smaller than that.

Therefore, a road-load map defining the relation between the vehicle speed and the output torque as the conversion traveling load characteristic shown in FIG. 4 is stored in the calculating section M17 for the road-load value and thereby, the calculating section M17 for the road-load value can calculate an appropriate torque at the time of traveling a vehicle at a constant speed. Hence the first embodiment is adapted to use the road-load map at the time of setting the output torque by the initial value setting section M16.

Figure 5:
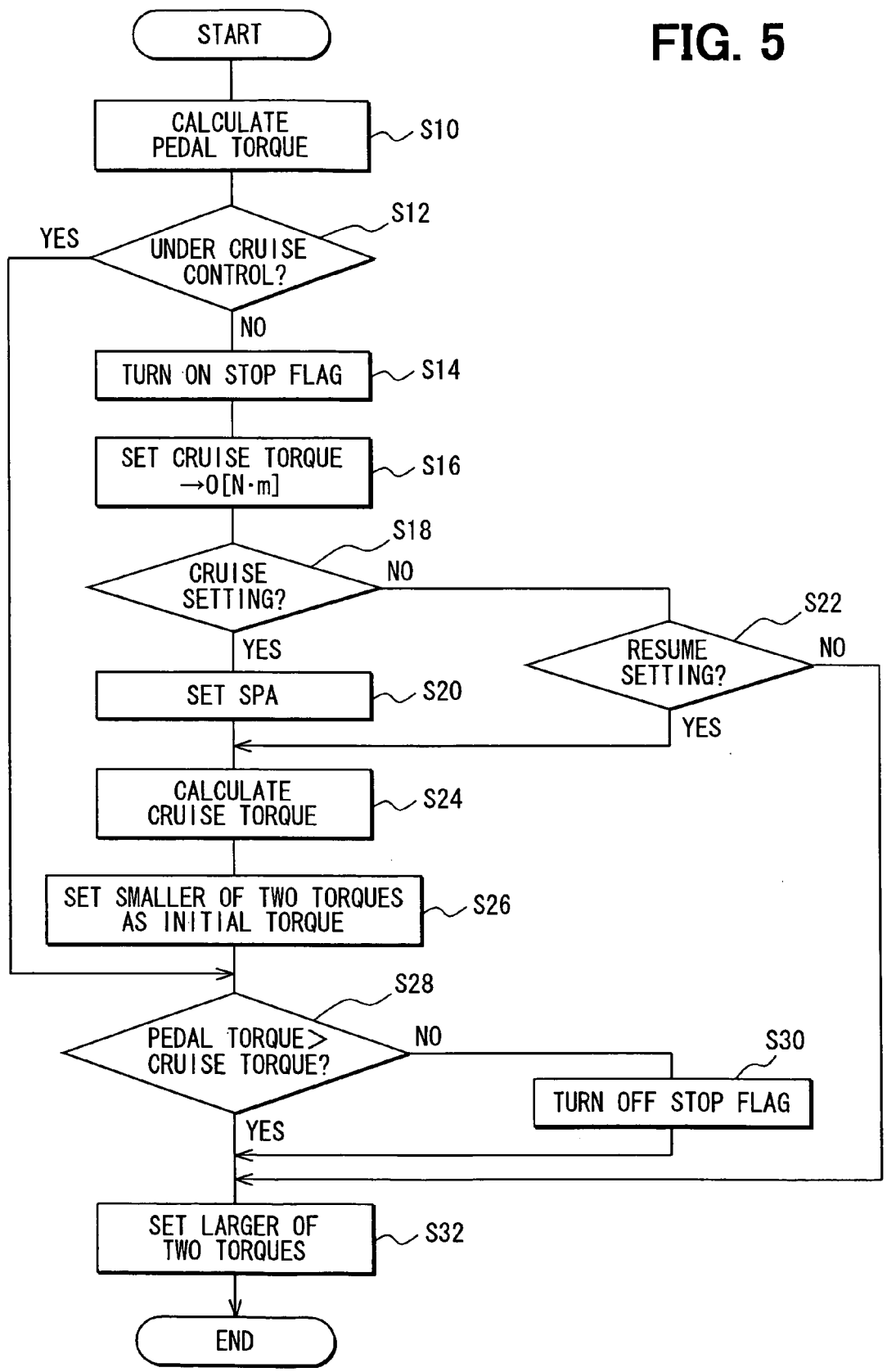
FIG. 5 is a flow chart showing processing of the cruise control in the first embodiment.

Herein the processing for the cruise control in the first embodiment is shown in FIG. 5. This processing is repeatedly executed, for example, at a predetermined cycle by the ECU 10.

In a series of steps in the processing, first at step S10, a pedal torque is calculated in accordance with an operation amount AP of the accelerator pedal (processing in the pedal torque setting section M20). At next step S12, it is determined whether or not the cruise control is already performed. Then, when it is determined that the cruise control is not performed yet, the process proceeds to step S14. At step S14, a feedback stop flag for stopping the feedback control by the calculating section M13 for the feedback term in FIG. 2 is set as ON (processing in the command section M18 for the feedback stop). At next step S16, the cruise torque is set as 0. That is, when the vehicle is not during the cruise controlling, the cruise torque is basically set as 0 for controlling the output torque of the diesel engine 2 in accordance with an operation amount of the accelerator pedal.

At next step S18, it is determined whether or not a set switch of the cruise control switch 18 is operated. When it is determined that the set switch is operated, at step S20 an actual vehicle speed at the time of the operating is set as a target vehicle speed of the cruise control. On the other hand, when it is determined that the set switch is not operated, at step S22 it is determined whether or not the resume switch is operated. Further, when the process at step S20 is completed or when it is determined at step S22 that the resume switch is operated, the process proceeds to step S24.

At step S24 a cruise torque in accordance with the target vehicle speed SPA set at step S20 (including a target vehicle speed set before the resume switch is operated) is calculated based upon the above road-load map (processing of the initial value setting section M16 for in FIG. 2). At next step S26 an initial value of the cruise torque is set based upon the smaller one of the pedal torque set at step S10 and the cruise torque calculated at step S24 (processing of the initial value setting section M16)

When the process at step S26 is completed or when it is determined at step S12 that the vehicle is during the cruise controlling, the process proceeds to step S28, wherein the pedal torque is compared with the cruise torque, thereby determining which is larger. When it is determined that the cruise torque is more than the pedal torque, the feedback stop flag is set as OFF at step S30. The processes at steps S26 to S30 are executed at the command section M18 for the feedback stop in FIG. 2.

On the other hand, when it is determined at step S28 that the pedal torque is greater than the cruise torque, when the process at step S30 is completed, or when it is determined at step S22 that the resume switch is not operated, the process proceeds to step S32. At step S32, the process where the larger one of the pedal torque and the cruise torque is set as a final output torque is executed (processing of the output torque calculating section M30 in FIG. 2).

When the output torque is thus calculated, a fuel injection quantity for generating the output torque is calculated and the fuel injection valve 8 is operated based upon the fuel injection quantity.

Figure 6:
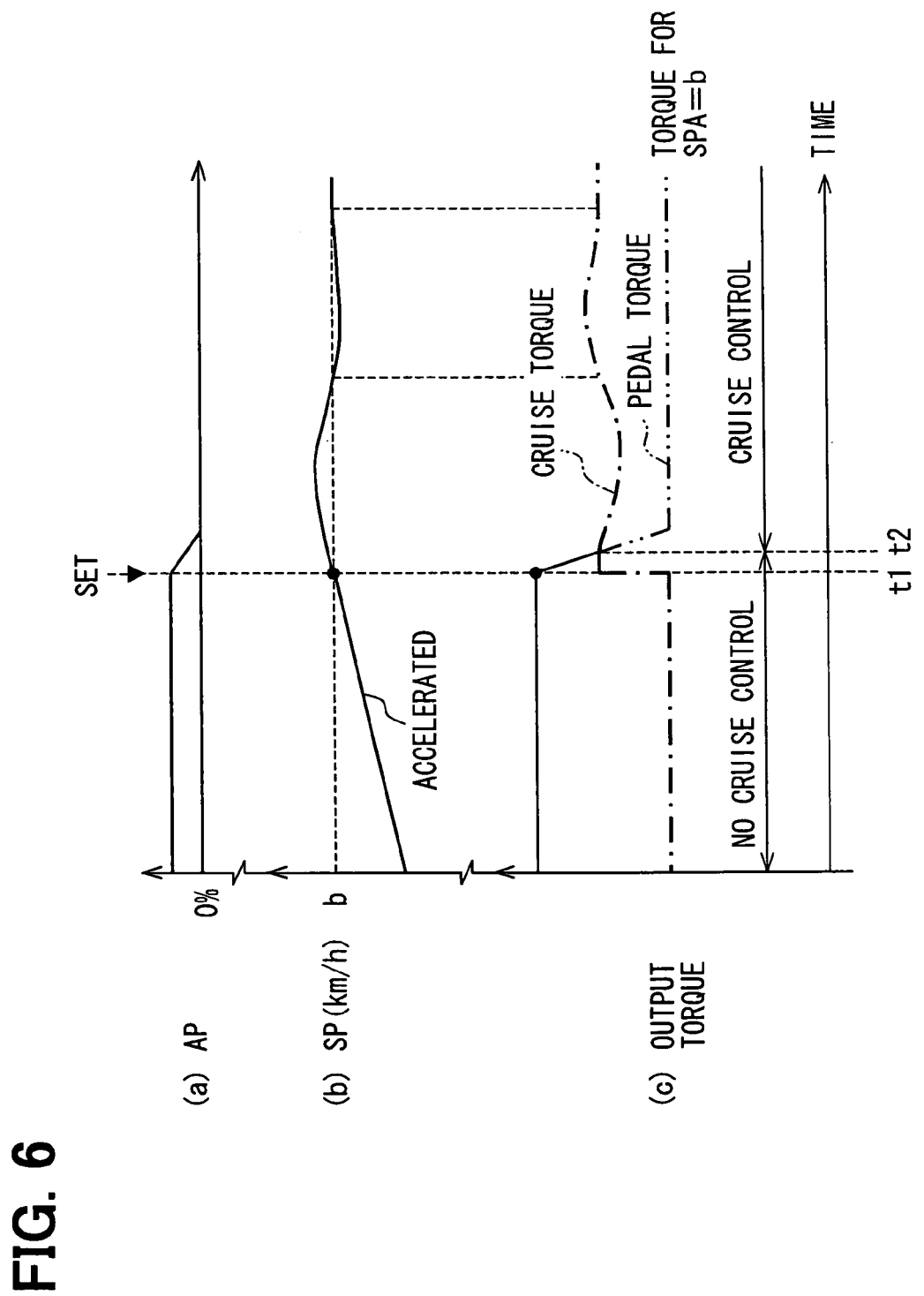
FIG. 6 is a time chart showing transitions of various parameters at the time of changing a vehicle from an acceleration state to the cruise control in the first embodiment.

FIG. 6 shows a case where the processing shown in FIG. 5 is executed at the transition from an acceleration state to cruise control. In FIG. 6, (a) shows a transition of an operation amount AP of the accelerator pedal, (b) shows a transition of an actual vehicle speed SP, and (c) shows a transition of output torque by a solid line, a transition of cruise torque by a dashed line and a transition of pedal torque by chain-double dashed line.

As shown in the figure, since the pedal torque is greater than the cruise torque prior to time t1, the output torque is defined as the pedal torque. When the set switch is operated at time t1, the vehicle speed b at this point is set as a target vehicle speed. In addition, at this point the torque required for traveling the vehicle at a constant speed as the vehicle speed b is calculated as cruise torque at step S24 in FIG. 5.

Since, during a period from time t1 to time t2, the pedal torque is greater than the cruise torque, the output torque is defined as the pedal torque and the cruise torque is fixed. After the set switch is, however, operated, since a user releases the accelerator pedal, the pedal torque quickly reduces. Since during this period, the output torque is provided in accordance with an operation amount of the accelerator pedal, a user does not have any uncomfortable feeling in traveling performance.

In addition, for a point after time t2, where the cruise torque is more than the pedal torque, the cruise torque is defined as the output torque and the feedback control for making the actual vehicle speed be equal to the target vehicle speed is started. Since the continuity of the output torque is kept at the time of transition from the pedal torque to the cruise torque, any torque shock does not occur.

Yet during a period until time t2 at a point where the cruise torque exceeds the pedal torque, the cruise torque is fixed. Therefore, even if the actual vehicle speed is greater than the target vehicle speed, an inappropriate reduction control for the cruise torque is avoided.

Figure 7:
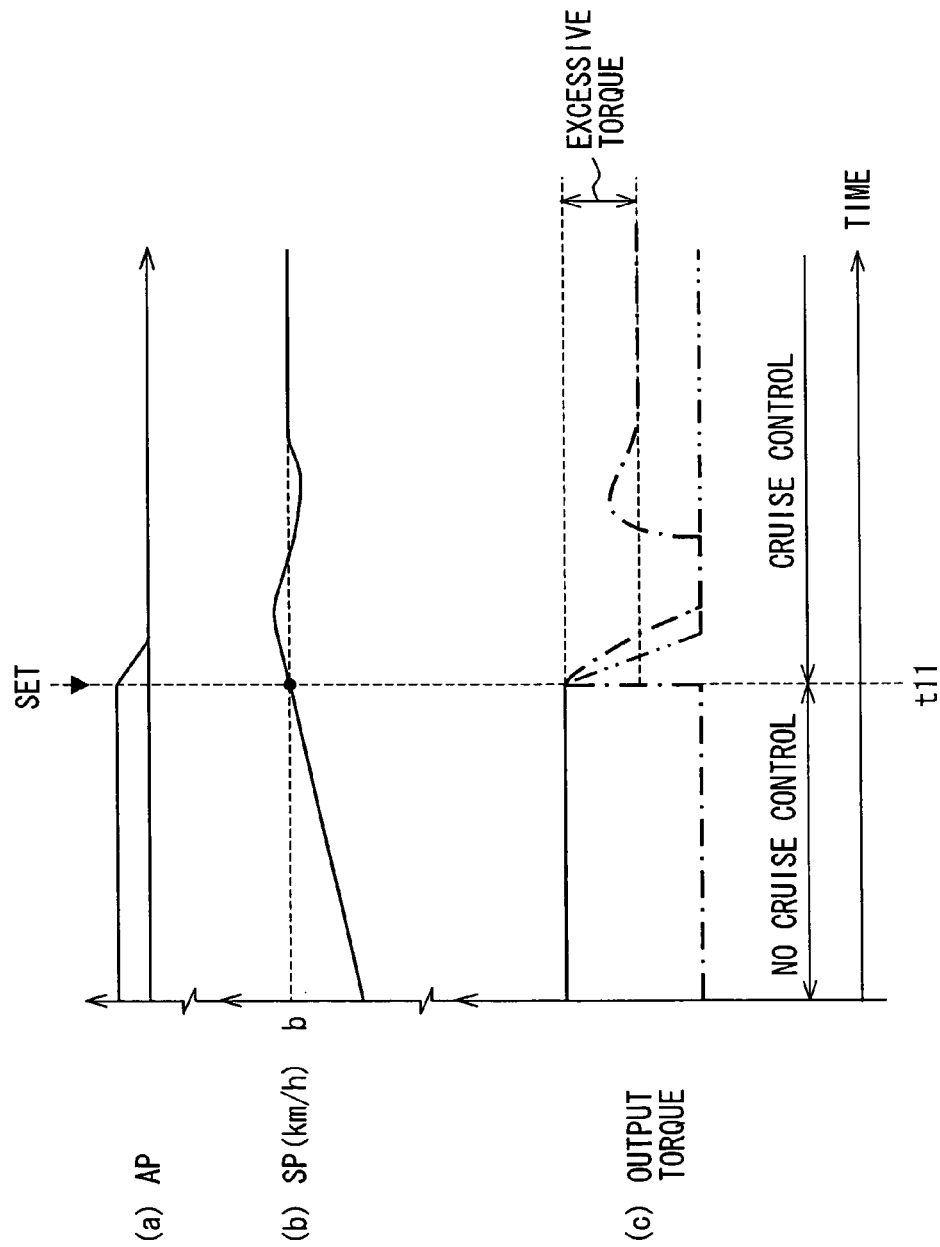
FIG. 7 is a time chart showing transitions of various parameters at the time of changing a vehicle from an acceleration state to cruise control in a comparative case of cruise control.

In contrast to this, FIG. 7 shows a comparative case where an initial value of the cruise torque at the time of operating the set switch is set as the pedal torque at the time of the set switch setting. In FIG. 7, (a) shows a transition of an operation amount of the accelerator pedal, (b) shows a transition of a vehicle speed and (c) shows a transition of output torque by a solid line, a transition of cruise torque by a dashed line and a transition of pedal torque by a chain-double dashed line.

In this case, when the set switch is set at time t11, an initial value of the cruise torque is defined as the pedal torque at time t11. In addition, for a point after time t11, a user releases the accelerator pedal and therefore, the pedal torque quickly reduces. On the other hand, the cruise torque is to be defined by the feedback control between the actual vehicle speed and the target vehicle speed. On this occasion, the cruise torque is greater than the torque required for making the actual vehicle speed be a vehicle speed b at the time of starting the cruise control and therefore the vehicle is accelerated. Further, the cruise torque is not reduced by the feedback control until the actual vehicle speed is greater than the target vehicle speed with acceleration of the vehicle. In addition, the acceleration state continues until the cruise torque becomes equivalent to the torque required for traveling at a constant speed of a vehicle speed b. Therefore, a user has an acceleration feeling after the set switch is operated, leading to deterioration in drivability.

Figure 8:
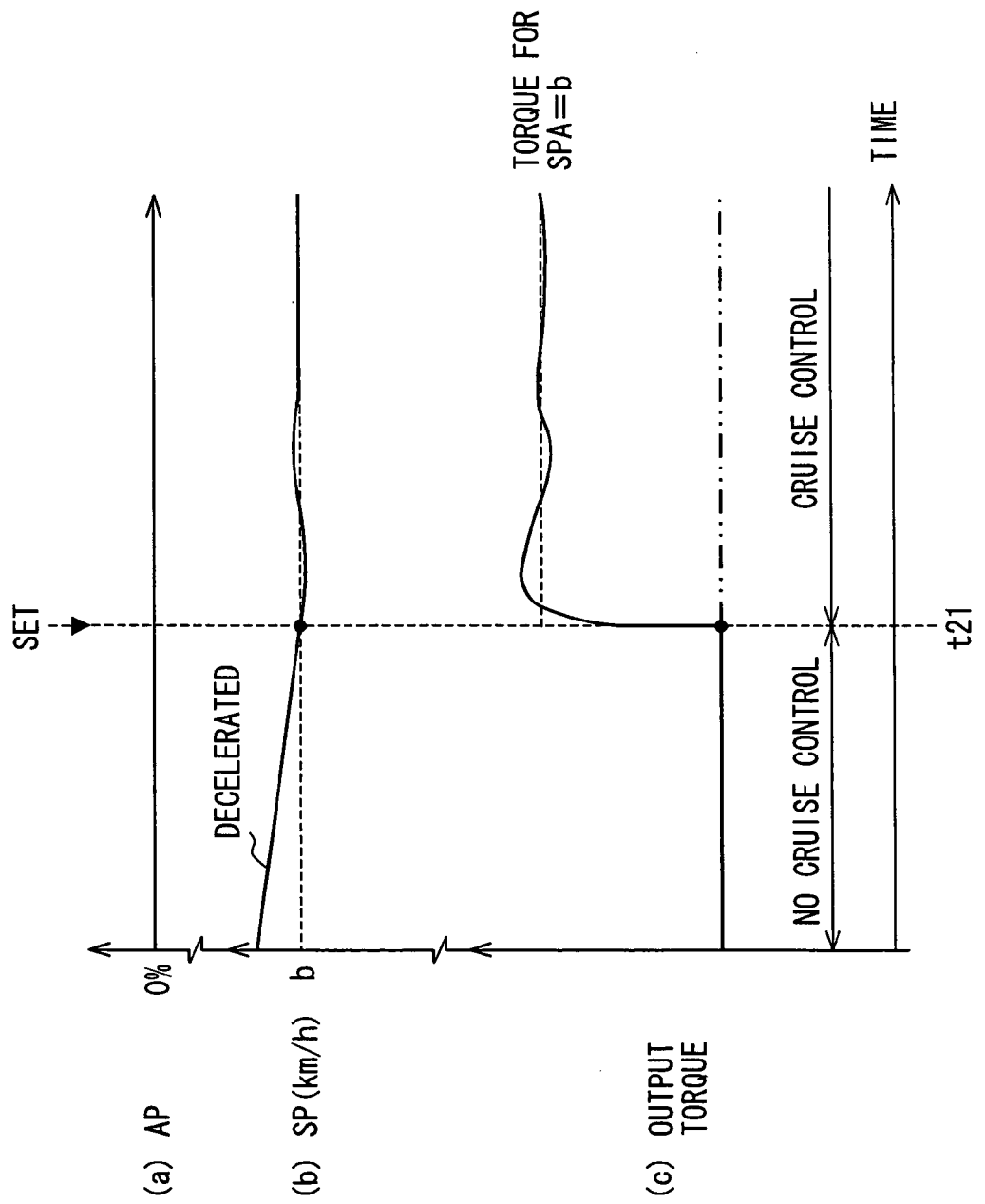
FIG. 8 is a time chart showing transitions of various parameters at the time of changing a vehicle from a deceleration state to the cruise control in the first embodiment.

On the other hand, FIG. 8 shows a case where the processing shown in FIG. 5 is executed at the transition from a deceleration state to cruise control. In FIG. 8, (a) shows a transition of an operation amount of the accelerator pedal, (b) shows a transition of a vehicle speed and (c) shows a transition of output torque by a solid line and a transition of pedal torque by chain-double dashed line.

As shown in the figure, since the accelerator pedal is released before the set switch is set at time t21, a vehicle is decelerated. When the set switch is set at time t21, an initial value of the cruise torque is defined as the pedal torque in this case and therefore becomes 0. In this case, however, since the initial value of the cruise torque is smaller than the torque required for traveling at a constant speed of a vehicle speed b, the vehicle is to be decelerated in such a manner that the actual vehicle speed be below the target vehicle speed. Thereby, the cruise torque is controlled to be equivalent to the torque required for traveling the vehicle at a constant speed of a vehicle speed b for making the actual vehicle speed follow the target vehicle speed.

Further, according to the processing shown in FIG. 5, not only at the time of the set switch operating but also at the time of the resume switch operating, effects similar to those shown in FIGS. 6 and 8 can be provided. That is, for example, when the resume switch is operated during acceleration to control the vehicle speed to be the target vehicle speed smaller than the then-actual vehicle speed, since the initial value of the cruise torque is set by the road-load value, the effect similar to that shown in FIG. 6 can be provided.

The following effects can be provided according to the first embodiment as described in detail.

(1) The initial value of the cruise torque is set based upon the smaller one out of the torque required for traveling a vehicle at a constant speed of a set target vehicle speed and the pedal torque. Therefore, it can be properly restricted or avoided to accelerate the vehicle at the time of the cruise control starting.

(2) After the start of the cruise control is instructed, at a point the cruise torque exceeds the pedal torque, the feedback control for making an actual vehicle speed be equal to a target vehicle speed is started. Therefore, when the output torque changes from the pedal torque to the cruise torque, the cruise torque can be defined as an appropriate value.

(3) There is provided a road-load data map defining a relation between the torque required for traveling a vehicle at a constant speed of a target vehicle speed and the vehicle speed. Thereby, a calculation load of the ECU 10 can be reduced.

Second Embodiment

In the first embodiment, the initial value of the cruise torque is set as the smaller one out of the road-load map value and the pedal torque. The road-load data value is, however, torque required for traveling a vehicle at a constant speed of a target vehicle speed in a preset traveling environment of the vehicle (assuming no wind and a flat road in the first embodiment). Therefore, an actual traveling environment can be different from the preset environment.

Accordingly, in the second embodiment, an initial value of the cruise torque is used as torque required for traveling a vehicle at a constant speed of a target vehicle speed, which is defined in consideration of a road slope, influence of winds or the like.

Figure 9:
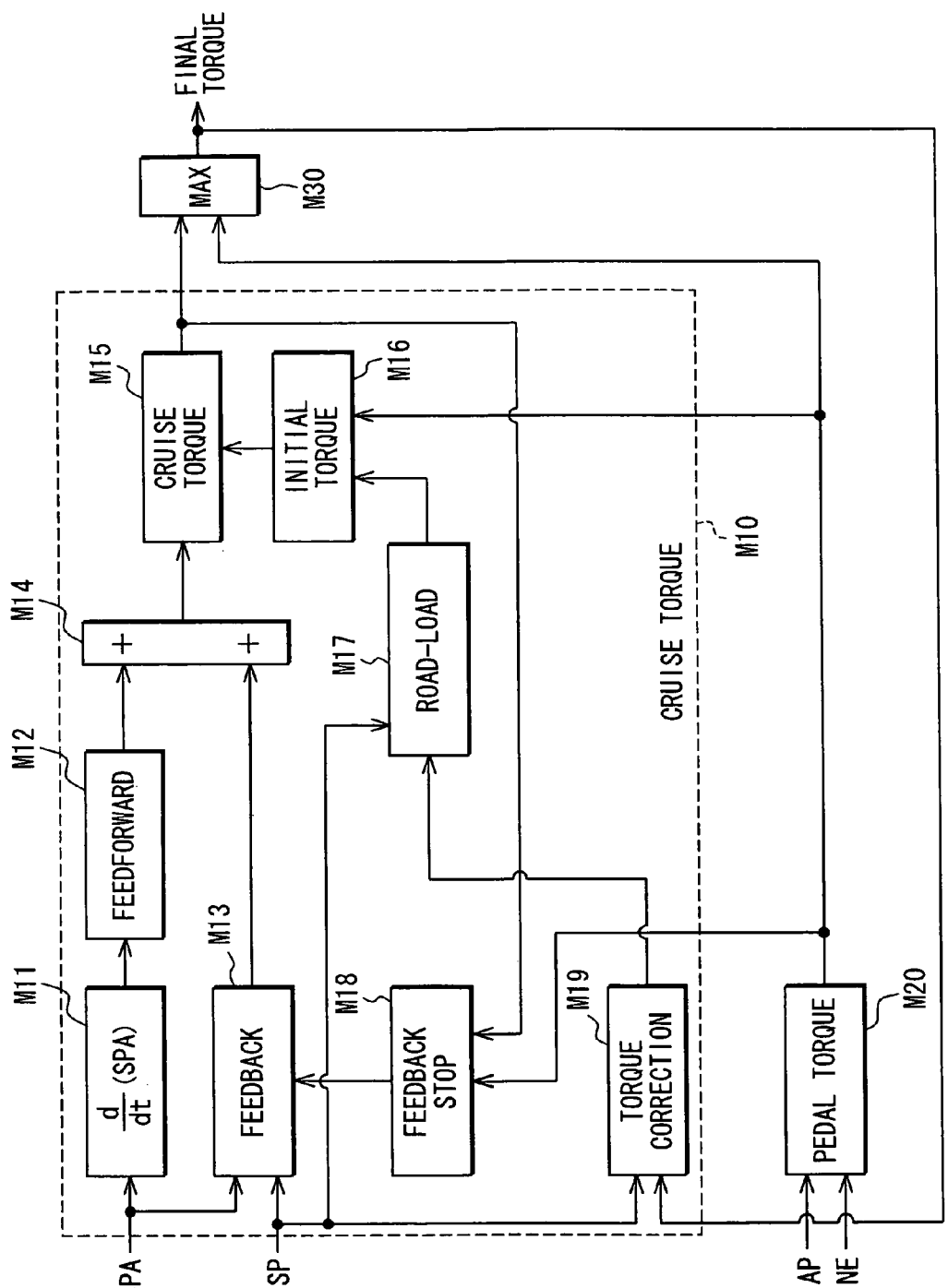
FIG. 9 is a functional block diagram showing cruise control in a second embodiment of the present invention.

As shown in FIG. 9, a cruise torque setting section M10 in the second embodiment is provided with a torque correction value calculating section M19, which calculates a torque correction value in accordance with forces acting in the traveling direction of a vehicle. In detail, the torque correction value in accordance with forces acting in the traveling direction is calculated based upon a final output torque as an output of an output torque calculating section M30 and an actual vehicle speed SP. In this processing, acceleration is calculated as a changing rate of an actual vehicle speed. A magnitude of a traveling direction component of gravity acceleration or force applied in the traveling direction of a vehicle by an adverse or head wind or a following wind is calculated based upon the final output torque, the calculated acceleration and the actual vehicle speed. That is, when the acceleration is small for the then-actual vehicle speed and the final output torque, it is considered that a vehicle is traveling on an uphill or against a headwind. Therefore, the forces caused by these are calculated. On the other hand, when the acceleration is large for the then-actual vehicle speed and the final output torque, it is considered that a vehicle is traveling on a downhill or with a following wind. Therefore, the forces caused by these are calculated. A correction value of the road-load map value is calculated in accordance with the forces applied in the traveling direction of the vehicle. This correction value is a value for reducing and correcting the road-load map value when the forces applied in the traveling direction of the vehicle are in the positive and a value for increasing and correcting the road-load map value when the forces applied in the traveling direction of the vehicle are in the negative.

At the calculating section M17 for the road-load value, the road-load map value is corrected with an output of the torque correction value calculating section M19 to calculate the torque required for traveling a vehicle at a constant speed of a target vehicle speed.

Further, the following effect can be provided in addition to the above effects (1) to (3) of the first embodiment, according to the second embodiment as described above.

(4) The forces applied in the traveling direction of a vehicle by a road slope, winds and the like are calculated to correct the road-load map value based upon the calculated forces. This allows an initial value of the cruise torque to be more appropriately set.

Other Embodiments

The aforementioned embodiments may be modified as follows.

The processes either at the time of the set switch operating or at the time of the resume switch operating in the processing shown in FIG. 5 may be executed.

Instead of a provision of the road-load map, an air resistance may be predicted and calculated in accordance with a vehicle speed to calculate the torque required for driving a vehicle at a constant speed each time of starting the cruise control.

The above effect (1) in the first embodiment can be provided even without executing the process for stopping the feedback control until the cruise torque exceeds the pedal torque.

The initial value of the cruise torque is not limited to either smaller one of the value calculated by the calculating section M17 for the road-load value and the pedal torque. For example, this initial value is set as a value smaller than the value calculated by the calculating section M17 for the road-load value. Thereby, it is possible to appropriately maintain drivability against great acceleration of a vehicle after the starting of the cruise control at the time of transition from the acceleration state to the cruise control.

An accelerator member is not limited to the accelerator pedal. Even in this case, it is effective to be provided with acceleration torque setting means which sets acceleration torque in accordance with an operation amount of the accelerator operation member corresponding to an acceleration demand.

In the above embodiments and modifications, for controlling an output torque of the diesel engine, the output torque (command value thereof) is actually calculated and a fuel injection quantity or the like is defined based upon the calculated output torque, but the present invention is not limited thereto. For example, a fuel injection quantity equivalent to the output torque is defined in accordance with an operation amount of the accelerator operation member, while, for performing the cruise control, a fuel injection quantity may be defined directly without using the output torque as a calculation parameter in the ECU 10 for feedback-controlling an actual vehicle speed to be equal to a target vehicle speed.

Further, in a case of using means which defines a fuel injection quantity as an output torque equivalent in accordance with an operation amount of the accelerator operation member, the cruise torque setting means may define an appropriate accelerator operation amount for feedback-controlling an actual vehicle speed to be equal to a target vehicle speed. In this case, the acceleration torque setting means is an operation amount of the accelerator operation member itself.

The in-vehicle engine is not limited to the diesel engine 2, but may be, for example, a gasoline engine. In this case, an opening of a throttle valve or the like is to be operated in accordance with the output torque or an equivalent thereto. In addition, the in-vehicle engine may be provided with an internal combustion engine and a motor.

While only the selected preferred embodiments have been chosen to illustrate the present invention, it will be apparent to those skilled in the art from this disclosure that various changes and modifications can be made therein without departing from the scope of the invention as defined in the appended claims. Furthermore, the foregoing description of the preferred embodiments according to the present invention is provided for illustration only, and not for the purpose of limiting the invention as defined by the appended claims and their equivalents.

What is claimed is:

1. A cruise control device for a vehicle comprising:
   determining means for determining whether cruise control is instructed by a cruise control switch;
   first setting means for setting an engine output torque for cruise control as a cruise torque based on a vehicle speed;
   second setting means for setting an engine output torque as a pedal torque based on an accelerator operation amount; and
   third setting means for setting a final engine output torque for cruise control by selecting a larger one of the cruise torque and the pedal torque,
   wherein, in starting cruise control in response to an instruction of cruise control by the cruise control switch, the cruise torque is set to an initial value by selecting a smaller one of the cruise torque and the pedal torque;
   wherein the cruise control device further comprises feedback control means for starting feedback control of the vehicle speed, when the cruise torque exceeds the pedal torque after the instruction of cruise control by the cruise control switch in a period during which the vehicle speed is changing.

2. The cruise control device according to claim 1, wherein the engine is a diesel engine, which is controlled to generate the final engine output torque.

3. The cruise control device according to claim 1, wherein the first setting means determines an initial cruise torque based on a predetermined function defining a relation between the engine output torque and the vehicle speed at the time of the instruction of cruise control by the cruise control switch.

4. The cruise control device according to claim 1, wherein the feedback control means stops the feedback-control of the vehicle speed until the pedal torque decreases to be lower than the cruise torque after the cruise control switch is operated in a period of acceleration of the vehicle.

5. A method of operating cruise control for a vehicle, the method comprising:
   determining whether cruise control is instructed by a cruise control switch;
   setting an engine output torque for cruise control as a cruise torque based on a vehicle speed;
   setting an engine output torque as a pedal torque based on an accelerator operation amount;
   setting a final engine output torque for cruise control by selecting a larger one of the cruise torque and the pedal torque;
   in starting cruise control in response to an instruction of cruise control by the cruise control switch, setting the cruise torque to an initial value by selecting a smaller one of the cruise torque and the pedal torque; and
   starting feedback control of the vehicle speed, when the cruise torque exceeds the pedal torque after the instruction of cruise control by the cruise control switch in a period during which the vehicle speed is changing.

6. The method according to claim 5, wherein the engine is a diesel engine, which is controlled to generate the final engine output torque.

7. The method according to claim 5, wherein an initial cruise torque is determined based on a predetermined function defining a relation between the engine output torque and the vehicle speed at the time of the instruction of cruise control by the cruise control switch.

8. The method according to claim 5, wherein the feedback-control of the vehicle speed is stopped until the pedal torque decreases to be lower than the cruise torque after the cruise control switch is operated in a period of acceleration of the vehicle.

* * * * *